(12) United States Patent
Shen et al.

(10) Patent No.: US 11,876,629 B1
(45) Date of Patent: Jan. 16, 2024

(54) DATA TRANSMISSION METHOD, DEVICE, ELECTRONIC EQUIPMENT, AND STORAGE MEDIUM

(71) Applicant: Hangzhou Keencool Intelligent Technology Co., Ltd., Hangzhou (CN)

(72) Inventors: Bin Shen, Hangzhou (CN); Xiang Zhang, Hangzhou (CN); Hangfei Tu, Hangzhou (CN)

(73) Assignee: Hangzhou Keencool Intelligent Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/197,790

(22) Filed: May 16, 2023

(30) Foreign Application Priority Data

Dec. 8, 2022 (CN) .......................... 202211568338.8

(51) Int. Cl.
*H04L 1/24* (2006.01)
*G06F 11/07* (2006.01)
*H04L 1/00* (2006.01)

(52) U.S. Cl.
CPC ............ *H04L 1/245* (2013.01); *G06F 11/079* (2013.01); *G06F 11/0745* (2013.01); *H04L 2001/0094* (2013.01)

(58) Field of Classification Search
CPC ..... G06F 11/0745; G06F 11/079; H04L 1/245
See application file for complete search history.

(56) References Cited

U.S. PATENT DOCUMENTS

| 6,530,043 B1 | 3/2003 | Beardsley et al. | |
| 2020/0052810 A1* | 2/2020 | Shapin | .................. H04L 1/1832 |
| 2021/0409388 A1* | 12/2021 | Batcher | .................. H04L 9/3239 |

FOREIGN PATENT DOCUMENTS

| CN | 109495215 A | 3/2019 |
| CN | 110519377 A | 11/2019 |
| CN | 112491675 A | 3/2021 |
| CN | 114090493 A | 2/2022 |
| CN | 114490464 A | 5/2022 |
| CN | 114500159 A | 5/2022 |
| CN | 115314155 A | 11/2022 |

* cited by examiner

*Primary Examiner* — Jigar P Patel
(74) *Attorney, Agent, or Firm* — Laine IP Oy

(57) ABSTRACT

The present disclosure provides a method, a device, electronic equipment, and a storage medium for data transmission, wherein the method includes sending data acquisition commands to a plurality of target devices and turning on a timer; for any first target device of the plurality of target devices, detecting whether there is first target data transmitted by the first target device on the bus within a preset timing time; if yes, performing a data verification on the first target data and determining a communication flag bit of the first target device based on the check result; and determining whether to receive the first target data transmitted by the first target device based on the communication flag bit of the first target device.

6 Claims, 5 Drawing Sheets

DATA TRANSMISSION METHOD, DEVICE, ELECTRONIC EQUIPMENT, AND STORAGE MEDIUM

CROSS-REFERENCE TO RELATED APPLICATIONS

The present disclosure claims priority to Chinese patent application No. 202211568338.8, entitled "Data Transmission Method, Device, Electronic Equipment, and Storage Medium", filed with the China Patent Office on Dec. 8, 2022, the entire content of which is incorporated by reference.

TECHNICAL FIELD

The present disclosure relates to the field of communication technology, in particular to a data transmission method, device, electronic equipment, and storage medium.

BACKGROUND ART

A communication network is a digital multipoint system with a differential balanced transmission, which generally adopts a master-slave communication method, that is, one master computer cooperates with multiple slave computers; at the same time, a half-duplex communication mode is adopted between the master computer and the multiple slave computers. Therefore, the communication network is widely used due to its advantages of low cost and simple design. At present, in the communication network, the half-duplex communication technology can only be used in a manner of inquiry by master computer and response by slave computers, that is to say, the master computer polls the slave computers in the bus one by one, and the slave computers respond to the master computer according to the polling mechanism, thus avoiding the conflict of signals in the bus which caused by multiple subjects of the communication network being in the transmitting state at the same time. However, in case of a single master computer being attached to more slave computers, the polling mechanism will lead to a long polling time and a slow communication speed, which cannot meet the fast exchange of data, thus making the communication efficiency lower.

SUMMARY

In view of this, the objective of the present disclosure is to provide a data transmission method, device, electronic equipment, and storage medium. The data transmission of multiple devices is determined by detecting the data flow on the bus, which reduces the overall communication time and enables that the normal transmission of data from other devices is not affected by problems in one device, thus improving the efficiency of data transmission.

The embodiment of the present disclosure provides a data transmission method, wherein the data transmission method comprises:

sending data acquisition commands to a plurality of target devices and turning on a timer;

for any first target device of the plurality of target devices, detecting whether there is first target data transmitted by the first target device on the bus within a preset timing time;

if yes, performing a data verification on the first target data and determining a communication flag bit of the first target device based on the check result; and determining whether to receive the first target data transmitted by the first target device based on the communication flag bit of the first target device.

In a possible embodiment, the preset timing time is determined by the following steps:

calculating a transmission time for each frame of target data based on the baud rate; and determining a timing time for each frame of target data based on a preset time interval and the transmission time.

In a possible embodiment, the data verification comprises a transmission length check and a cyclical redundancy check; and the step of performing a data verification on the first target data and determining a communication flag bit of the first target device based on the check result comprises:

detecting whether a transmission length of the first target data is consistent with a preset target transmission length;

if they are consistent, performing a cyclical redundancy check on the first target data, and if the cyclical redundancy check is passed, identifying the communication flag bit of the first target device as a first communication flag bit; and if the cyclical redundancy check is not passed, identifying the communication flag bit of the first target device as a second communication flag bit; and if they are not consistent, identifying the communication flag bit of the first target device as a third communication flag bit, and continuing to wait for the transmission of the first target data.

In a possible embodiment, after the step of for any first target device of the plurality of target devices, detecting whether there is first target data transmitted by the first target device on the bus within a preset timing time, the data transmission method further comprises:

if not, identifying the communication flag bit of the first target device as a second communication flag bit.

In a possible embodiment, the step of determining whether to receive the first target data transmitted by the target device based on the communication flag bit of the first target device comprises:

detecting the type of the communication flag bit of the first target device;

if the communication flag bit is a first communication flag bit, performing a data processing corresponding to the first target data and receiving a next target data of the first target device after processing is complete;

if the communication flag bit is a second communication flag bit, sending a data error identification and receiving a second target data from a second target device; and if the communication flag bit is a third communication flag bit, skipping the processing of the first target data and receiving the second target data from the second target device of the plurality of the target devices.

In a possible embodiment, after the step of if the communication flag bit is a third communication flag bit, sending a data error identification and receiving a second target data from a second target device, the data transmission method further comprises:

sending data acquisition commands at intervals of the preset timing time to the first target device corresponding to the third communication flag bit;

determining whether the status of the first target device corresponding to the third communication flag bit is normal or not, based on the collected second target data, which is sent by the first target device that corresponds to the third communication flag bit;

if it is normal, changing the third communication flag bit of the first target device to the first communication flag bit.

The embodiment of the present disclosure further provides a data transmission device, wherein the data transmission device comprises:

a command sending module, configured for sending data acquisition commands to a plurality of target devices and turning on a timer;

a detection module, configured for detecting whether there is first target data transmitted by the first target device on the bus within a preset timing time, for any first target device of the plurality of target devices;

a check module, configured for, if yes, performing a data verification on the first target data and determining a communication flag bit of the first target device based on the check result; and a first determination module, configured for determining whether to receive the first target data transmitted by the first target device based on the communication flag bit of the first target device.

In a possible embodiment, the detection module determines the preset timing time by the following steps:

calculating a transmission time for each frame of target data based on the baud rate; and determining a timing time for each frame of target data based on a preset time interval and the transmission time.

The embodiment of the present disclosure also provides electronic equipment, wherein the electronic equipment comprises: a processor, a memory, and a bus, the memory stores machine-readable instructions that are executed by the processor, the processor communicates with the memory via the bus when the electronic equipment is in operation, and the machine-readable instructions perform the steps of the data transmission method as described above when run by the processor.

The embodiment of the present disclosure also provides a computer-readable storage medium, wherein the computer-readable storage medium is provided with a computer program stored thereon; and the computer program performs the steps of the data transmission method as described above when run by a processor.

The embodiment of the present disclosure provides a method, a device, electronic equipment, and a storage medium for data transmission, wherein the method comprises sending data acquisition commands to a plurality of target devices and turning on a timer; for any first target device of the plurality of target devices, detecting whether there is first target data transmitted by the first target device on the bus within a preset timing time; if yes, performing a data verification on the first target data and determining a communication flag bit of the first target device based on the check result; and determining whether to receive the first target data transmitted by the first target device based on the communication flag bit of the first target device. Data transmission of multiple devices is determined by detecting the data flow on the bus, which reduces the overall communication time and enables the normal transmission of data from other devices without being affected due to a problem with one device, thus improving the efficiency of data transmission.

In order to make the above objective, features, and advantages of the present disclosure more obvious and easier to understand, the following is a better example, and with the attached drawings, the detailed description is as follows.

BRIEF DESCRIPTION OF DRAWINGS

To more clearly illustrate the technical solutions of the embodiments of the present disclosure, the following will briefly introduce the accompanying drawings used in the embodiments. It should be understood that the following drawings only show some embodiments of the present disclosure, and therefore they should not be regarded as a limitation on the scope. Those ordinarily skilled in the art can also obtain other related drawings based on these drawings without inventive effort.

DETAILED DESCRIPTION OF EMBODIMENTS

Figure 1:
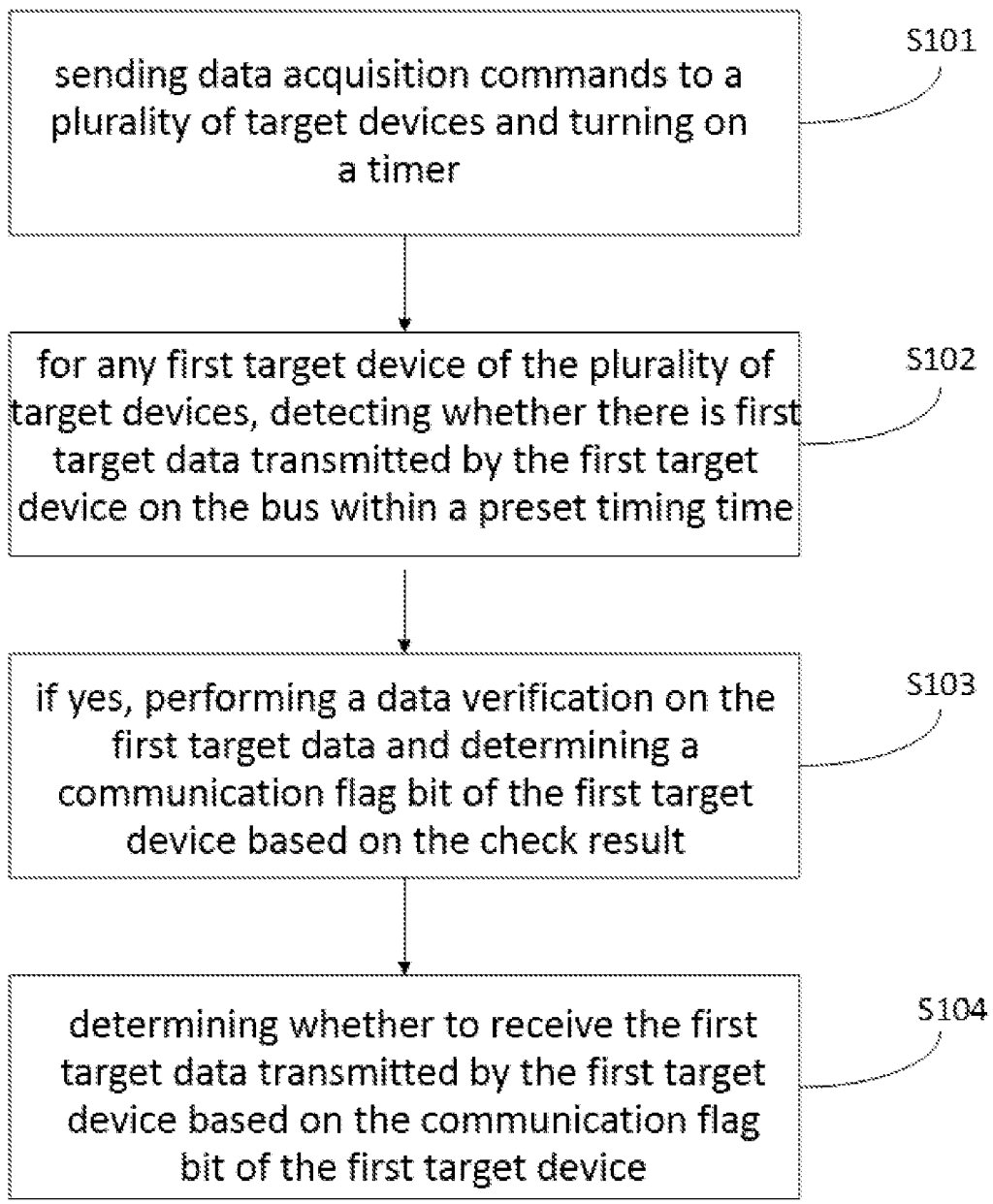
FIG. 1 is a flowchart of a data transmission method provided by the embodiment of the present disclosure.

In order to make the objective, technical solutions, and advantages of the embodiment of the present disclosure clearer, the technical solutions in the embodiment of the present disclosure will be clearly and completely described below in conjunction with the accompanying drawings. It should be noted that the accompanying drawings in the present disclosure merely serve the purpose of illustration and description, and are not intended to limit the scope of protection of the present disclosure. In addition, it should be understood that the schematic accompanying drawings are not drawn to a physical scale. The flowcharts used in the present disclosure illustrate operations implemented according to some embodiments of the present disclosure. It should be understood that the operations of the flowchart can be implemented out of sequence, and steps without logical contextual relationships can be reversed in order or implemented simultaneously. In addition, persons skilled in the art, guided by the contents of the present disclosure, may add one or more other operations to the flowchart and may remove one or more operations from the flowchart.

In addition, the described embodiments are only a part of the embodiments of the present disclosure, and not all of them. The components of embodiments of the present disclosure which are generally described and illustrated in the drawings herein can be arranged and designed in a variety of different configurations. Accordingly, the following detailed description of the embodiments of the present disclosure provided in the accompanying drawings is not intended to limit the scope of the claimed disclosure, but merely represents selected embodiments of the present disclosure. Based on the embodiments of the present disclosure, all other embodiments obtained by persons skilled in the art without inventive efforts fall within the scope of protection of the present disclosure.

In order to enable persons skilled in the art to use the contents of the present disclosure, combining a particular application scenario "to transmit data", the following embodiment is given. For those skilled in the art, the general principles defined herein can be applied to other embodiments and application scenarios without departing from the spirit and scope of the present disclosure.

The following method, device, electronic equipment, or computer-readable storage medium of the embodiment of the present disclosure can be applied to any scenario in which data needs to be transferred. The embodiment of the present disclosure does not limit the specific application scenario, and any solution using a data transmission method, device, electronic equipment, and storage medium provided by the embodiment of the present disclosure is within the scope of protection of the present disclosure.

First, the application scenarios to which the present disclosure can be applied are introduced. The present disclosure can be applied in the field of communication technology.

The study found that a communication network is a digital multipoint system with differential balanced transmission, which generally adopts a master-slave communication method, i.e., one master computer with multiple slave computers; at the same time, a half-duplex communication mode is adopted between the master computer and the multiple slave computers. Therefore, the communication network is widely used due to its advantages of low cost and simple design. At present, in the communication network, the half-duplex communication technology can only be used in a manner of inquiry by master computer and response by slave computer, that is to say, the master computer polls the slave computers in the bus one by one, and the slave computers respond to the master computer according to the polling mechanism, thus avoiding the conflict of signals in the bus which caused by multiple subjects of the communication network being in the transmitting state at the same time. However, in case of a single master computer being attached to more slave computers, the polling mechanism will lead to a long polling time and a slow communication speed, which cannot meet the fast exchange of data, thus making the communication efficiency lower.

Based on this, the embodiment of the present disclosure provides a data transmission method. The data transmission of multiple devices is determined by detecting the data flow on the bus, which reduces the overall communication time and enables the normal transmission of data from other devices without being affected by problems in one device, thus improving the efficiency of data transmission.

Referring to FIG. 1, FIG. 1 is a flowchart of a data transmission method provided by the embodiment of the present disclosure. As shown in FIG. 1, the data transmission method provided by the embodiment of the present disclosure comprises steps as follows.

S101: sending data acquisition commands to a plurality of target devices and turning on a timer.

In this step, data acquisition commands are sent to a plurality of target devices and a timer is turned on.

Here, the controller sends data acquisition commands to a plurality of target devices and turns on a timer.

The target devices can be communication devices, transmission devices, and so on; and any device capable of performing data transmission and communication can be the target device, which does not limit the type of the target device.

In addition to sending data acquisition commands and turning on the timer, the controller can also send a start address and an end address of the protocol.

S102: for any first target device of the plurality of target devices, detecting whether there is first target data transmitted by the first target device on the bus within a preset timing time.

This step, for any first target device of target devices, is to detect whether there is first target data transmitted by the first target device on the bus within a preset timing time.

The bus can be a connection line that communicates with the first target device by using the 485 communication interface and the controller, and the first target data needs to be transferred to the controller through the bus on the first target device.

The first target data is the target data transmitted to the controller according to the data acquisition commands.

The timer is configured to time the transmission of the first target data.

In a possible embodiment, the preset timing time is determined by the following steps.

A: calculating a transmission time for each frame of target data based on the baud rate.

The transmission time for each frame of target data is calculated according to the baud rate.

The baud rate can be 9600, etc.

B: determining a preset timing time for each frame of target data based on a preset time interval and the transmission time.

The preset timing time for each frame of target data is calculated according to a preset time interval and the transmission time.

The preset time interval can be 0.5 ms, and if the transmission time is 3.5 ms, the timing time is 4 ms.

In the specific embodiment, the 485 Modbus protocol data can be referred to as fixed-length data. The length of the returned data can be calculated after the controller sends a control or read command. The timer is turned on after sending the command. The transmission time of each frame of target data is calculated according to the baud rate; and thus, a trigger time of the timer is set, wherein the timing time needs to be 0.5 ms larger than the transmission time of each frame of target data.

S103: if yes, performing a data verification on the first target data and determining a communication flag bit of the first target device based on the check result.

In this step, if the fact that the first target data transmitted by the first target device exists on the bus is detected within the preset timing time, a data verification is performed on the first target data and a communication flag bit of each first target device is determined based on the check result.

The data verification comprises a transmission length check and a cyclical redundancy check.

The communication flag bits comprise a first communication flag bit, a second communication flag bit, and a third communication flag bit, wherein the first communication flag bit can be represented by 0, the second communication flag bit can be represented by 2, and the third communication flag bit can be represented by 1.

In a possible embodiment, the data verification comprises a transmission length check and a cyclical redundancy check; and the step of performing a data verification on the first target data and determining a communication flag bit of the first target device based on the check result comprises the following steps.

a: detecting whether a transmission length of the first target data is consistent with a preset target transmission length.

This step detects whether the transmission length of the first target data is consistent with a preset target transmission length.

A preset target transmission length, such as 4-bit int, is the length of the first target data that needs to be sent by the first target device, which is preset by the controller.

For example, if the transmission length of the first target data is 3-bit int while the preset target transmission length is 4-bit int, it means that the transmission in the first target data of the first target device is not completely finished.

b: if they are consistent, performing a cyclical redundancy check on the first target data, and if the cyclical redundancy check is passed, identifying the communication flag bit of the first target device as a first communication flag bit; and if the cyclical redundancy check is not passed, identifying the communication flag bit of the first target device as a second communication flag bit.

In this step, if the transmission length of the first target data is consistent with the preset target transmission length, a cyclical redundancy check is performed on the first target data, and if the cyclical redundancy check is passed, the communication flag bit of the first target device is identified as a first communication flag bit; and if the cyclical redundancy check is not passed, the communication flag bit of the first target device is identified as a second communication flag bit.

Cyclical redundancy check (CRC) is an error detection function of data transmission, which performs a polynomial calculation on the data and appends the obtained result to the end of the frame; and the receiving device performs a similar algorithm to ensure the correctness and integrity of the data transmission. If not passing the CRC, the system repeatedly copies data to the hard disk, which gets into a dead loop, causing the copy process to fail to complete. There are many possible reasons for an error in the cyclical redundancy check, including hardware and software failures.

c: if they are not consistent, identifying the communication flag bit of the first target device as a third communication flag bit, and continuing to wait for the transmission of the first target data.

In this step, if the transmission length of the first target data is not consistent with the preset target transmission length, it means that the data transmission of the first target device is not completely finished, thus continuing to wait for the transmission of the first target data.

In the specific embodiment, whether the transmission length of the first target data is equal to a preset target transmission length is detected, wherein if the transmission length of the first target data is consistent with the preset target transmission length, a cyclical redundancy check is performed on the first target data, wherein if the cyclical redundancy check is passed, the communication flag bit of the first target device is identified as a first communication flag bit; and if the cyclical redundancy check is not passed, the communication flag bit of the first target device is identified as a second communication flag bit; and if the transmission length of the first target data is not consistent with the preset target transmission length, it means that the data transmission of the first target device is not completely finished, thus continuing to wait for the transmission of the first target data. By conducting twice data checks, the accuracy of the data transmitted to the controller can be ensured, so as to avoid errors in data transmission and improve the accuracy rate of data transmission.

In another specific embodiment, whether the first target data passes the cyclical redundancy check is detected, wherein if the cyclical redundancy check is passed, whether the transmission length of the first target data is consistent with the preset target transmission length is detected, wherein if the transmission length of the first target data is consistent with the preset target transmission length, the communication flag bit of the first target device is identified as a first communication flag bit; and if the transmission length of the first target data is not consistent with the preset target transmission length, the communication flag bit of the first target device is identified as a third communication flag bit, which indicates that the data transmission of the first target device is not completely finished, thus continuing to wait for the transmission of the first target data. If the cyclical redundancy check is not passed, the communication flag bit of the first target device is identified as a second communication flag bit. By conducting twice data checks, the accuracy of the data transmitted to the controller can be ensured, so as to avoid errors in data transmission and improve the accuracy rate of data transmission.

S104: determining whether to receive the first target data transmitted by the first target device based on the communication flag bit of the first target device.

In this step, whether to receive the first target data transmitted by the first target device is determined according to the communication flag bit of each first target device.

In a possible embodiment, the step of determining whether to receive the first target data transmitted by the target device based on the communication flag bit of the first target device comprises the following steps.

(1) Detecting the type of the communication flag bit of the first target device.

In this step, the type of the communication flag bit of the first target device is detected.

The type of communication flag bits comprises a first communication flag bit, a second communication flag bit, and a third communication flag bit.

(2) If the communication flag bit is a first communication flag bit, performing a data processing corresponding to the first target data and receiving a next target data of the first target device after processing is complete.

In this step, if a communication flag bit is the first communication flag bit, a corresponding data processing is performed to the first target data and a next target data of the first target device is received after processing is complete.

The next target data is the next target data after the processing for the first target data is completed.

In this step, the data processing is to process the first target data in the controller, then the timer is turned off, and the next target data of the first target device is received when the processing is completed, wherein the process of receiving the next target data of the first target device is consistent with the above step, and this part will not be repeated.

(3) If the communication flag bit is a second communication flag bit, sending a data error identification and receiving a second target data from a second target device.

In this step, if a communication flag bit is a second communication flag bit, a data error identification is sent and a second target data from a second target device is received.

The error flag bit corresponding to the error identification is added by 1.

The second target device is the other device.

(4) If the communication flag bit is a third communication flag bit, skipping the processing of the first target data and receiving the second target data from the second target device of the plurality of the target devices.

In this step, if the communication flag bit is a third communication flag bit, the data processing for the first target data is skipped and the second target data of the second target device is received.

In this step, if the communication flag bit is a third communication flag bit, the controller then skips the data processing for the first target data but performs the processing tasks for the other data already transmitted to the controller, and receives the second target data from the second target device after the processing is completed.

In a specific embodiment, the type of the communication flag bit of the first target device is detected, wherein if the type of the communication flag bit is 0, a corresponding data processing is performed to the first target data and a next target data of the first target device is received when the processing is completed; if the communication flag bit is 1, the controller then skips the data processing for the first target data but performs the processing tasks for the other data already transmitted to the controller; and if the communication flag bit is 2, a data error identification is sent and a second target data from a second target device is received.

In a possible embodiment, after the step of for any first target device of the plurality of target devices, detecting whether there is first target data transmitted by the first target device on the bus within a preset timing time, the data transmission method further comprises:

if not, identifying the communication flag bit of the first target device as a third communication flag bit.

In this step, it is detected that there is no first target data transmitted by the first target device on the bus within a preset timing time, then the communication flag bit of the first target device is identified as a third communication flag bit.

In a possible embodiment, after the step of if the communication flag bit is a third communication flag bit, sending a data error identification and receiving a second target data from a second target device, the data transmission method further comprises the following steps.

S1041: sending data acquisition commands at intervals of the preset timing time to the first target device corresponding to the third communication flag bit.

In this step, if the error identification corresponding to the first target device is less than 2, the data acquisition commands are resent to the first target device corresponding to the third communication flag bit.

S1042: determining whether the status of the first target device corresponding to the third communication flag bit is normal or not, based on the collected second target data corresponding to the third communication flag bit.

In this step, if the fact that the second target data corresponding to the third communication flag bit exists on the bus is detected within the preset timing time and the first target data corresponding to the third communication flag bit passes the data check, it indicates that the first target device corresponding to the third communication flag bit has sent the second target data normally; and if the first target data corresponding to the third communication flag bit is not detected on the bus within the timing time or the second target data corresponding to the third communication flag bit does not pass the data check, it indicates that the first target device corresponding to the third communication flag bit has still sent the second target data abnormally.

S1043: if yes, changing the third communication flag bit of the first target device to the first communication flag bit.

In this step, if it is normal, the third communication flag bit is changed to the first communication flag bit, for completing the data transmission of the first target device corresponding to the third communication flag bit.

In a specific embodiment, if the error identification corresponding to the first target device is less than 2, the controller resends the data acquisition commands to the first target device corresponding to the third communication flag bit, and detects whether the first target device that corresponds to the third communication flag bit sends the first target data normally according to the first target data corresponding to the third communication flag bit, wherein if it is normal, the third communication flag bit is changed to the first communication flag bit, thereby completing data transmission of the first target device corresponding to the third communication flag bit, and if it is not normal, no further data transmission is performed to the first target device.

In another specific embodiment, the transmission data in 485 Modbus protocol can be referred to as fixed-length data. The length of the returned first target data of each first target device can be calculated after the controller sends data acquisition commands to the plurality of the first target devices. The timer is turned on after sending the command. The transmission time of each frame of first target data is calculated according to the baud rate; and thus, the timing time of the timer is set, and if the data is received normally, the timing time count is cleared before triggering then retiming. During the period, the function code, address, length, and the crc check of the received data are verified, wherein if the first target data is transmitted correctly, the communication flag bit is 0; if the specified data length is not received, the communication flag bit is 1; and if the timer triggers a timeout when the data length is not enough or the crc check is failed, the data reception is regarded as an error, and the communication flag bit is 2. A monitoring for the communication flag bit is performed in the main polling, wherein if the communication flag bit is a first communication flag bit, a data processing corresponding to the first target data is performed and a next target data of the first target device is received after processing is complete; if the communication flag bit is a second communication flag bit, the processing of the first target data is skipped and the second target data of the second target device is received; and if the communication flag bit is a third communication flag bit, a data error identification is sent and a second target data from a second target device is received.

Figure 2:
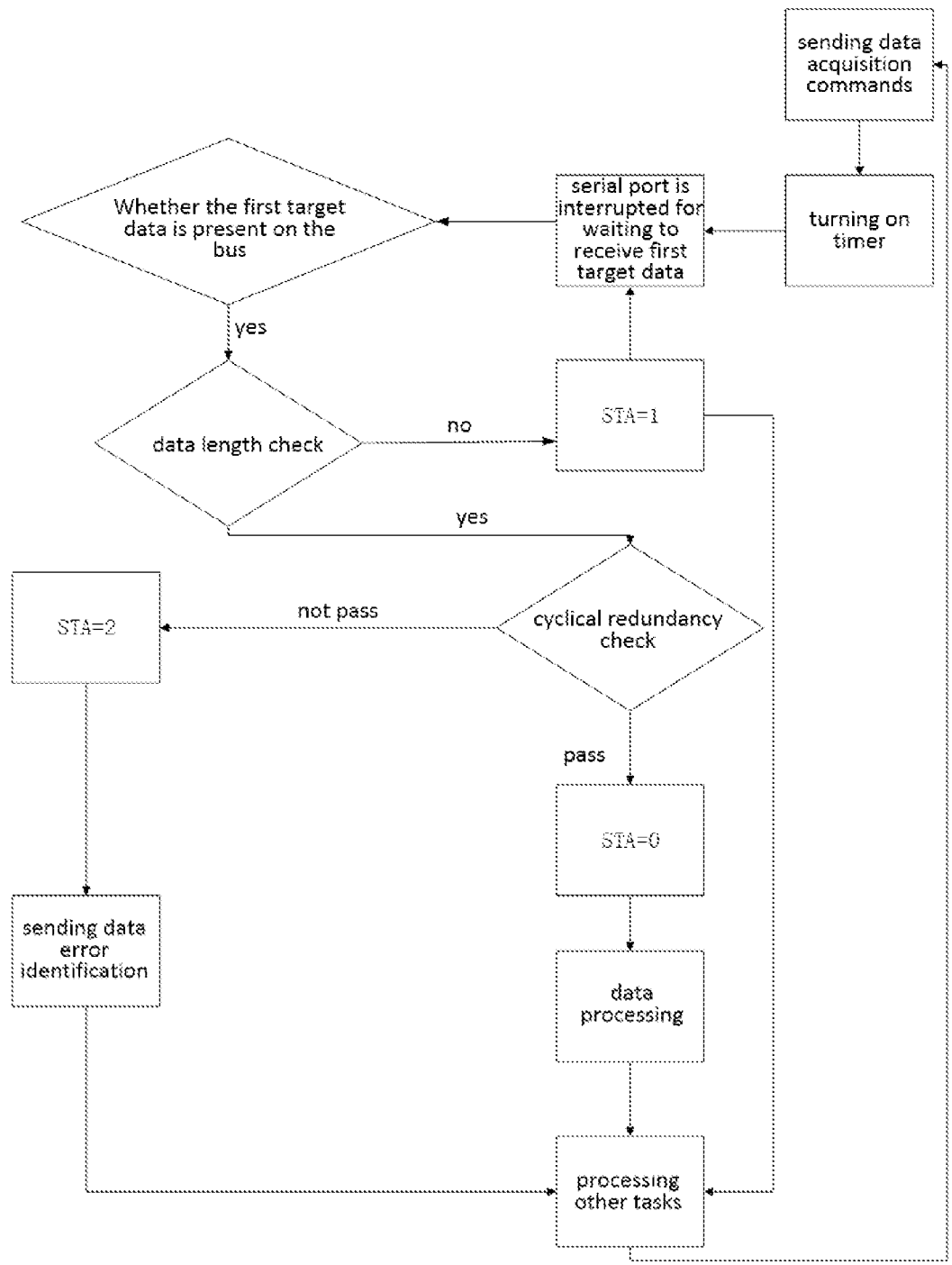
FIG. 2 is a schematic flowchart of a data transmission method provided by the embodiment of the present disclosure.

Further, referring to FIG. 2, FIG. 2 is a schematic flowchart of a data transmission method provided by the embodiment of the present disclosure. As shown in FIG. 2, after the controller sends data acquisition commands to the plurality of the first target devices, the timer is turned on and the serial port is interrupted during the timing time, for waiting to receive the first target data. Whether the first target data is present on the bus is detected, wherein if yes, the data length check is performed, wherein if the data length check is passed, the cyclical redundancy check is performed, wherein if the cyclical redundancy check is passed, then the communication flag bit is identified as 0. Here, STA is the communication flag bit. If there is no first target data on the bus, the communication flag bit is identified as 2. If the data length check is not passed, the communication flag bit is identified as 1 and the first target data continues to wait to be received by the serial port. If the cyclical redundancy check is not passed, the communication flag bit is identified as 2. The type of communication flag bit is detected, wherein if STA=1, the controller skips the processing of the first target data but processes other tasks; if STA=0, the controller performs the corresponding data processing on the first target data and receives the next target data of the first target device when the processing is completed; and if STA=2, the error identification of the data is sent, and the controller processes other tasks, and receives the second target data of the second target device.

The embodiment of the present disclosure provides a data transmission method, wherein the data transmission method comprises: sending data acquisition commands to a plurality of target devices and turning on a timer; for any first target device of the plurality of target devices, detecting whether there is first target data transmitted by the first target device on the bus within a preset timing time; if yes, performing a data verification on the first target data and determining a communication flag bit of the first target device based on the check result; and determining whether to receive the first target data transmitted by the first target device based on the communication flag bit of the first target device. Data transmission of multiple devices is determined by detecting the data flow on the bus, which reduces the overall communication time and enables the normal transmission of data from other devices without being affected by problems in one device, thus improving the efficiency of data transmission.

Figure 3:
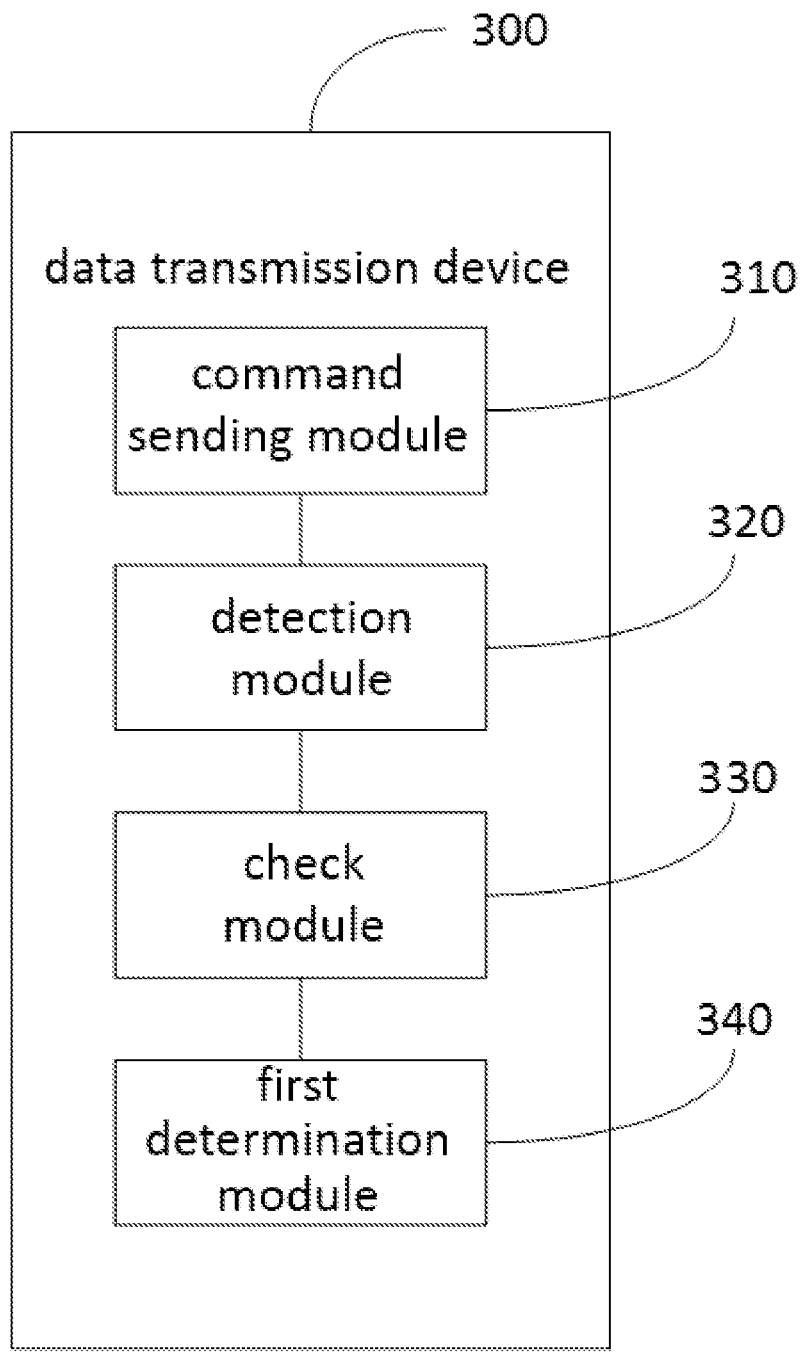
FIG. 3 is a first schematic diagram of the structure of a data transmission device provided by the embodiment of the present disclosure.
Figure 4:
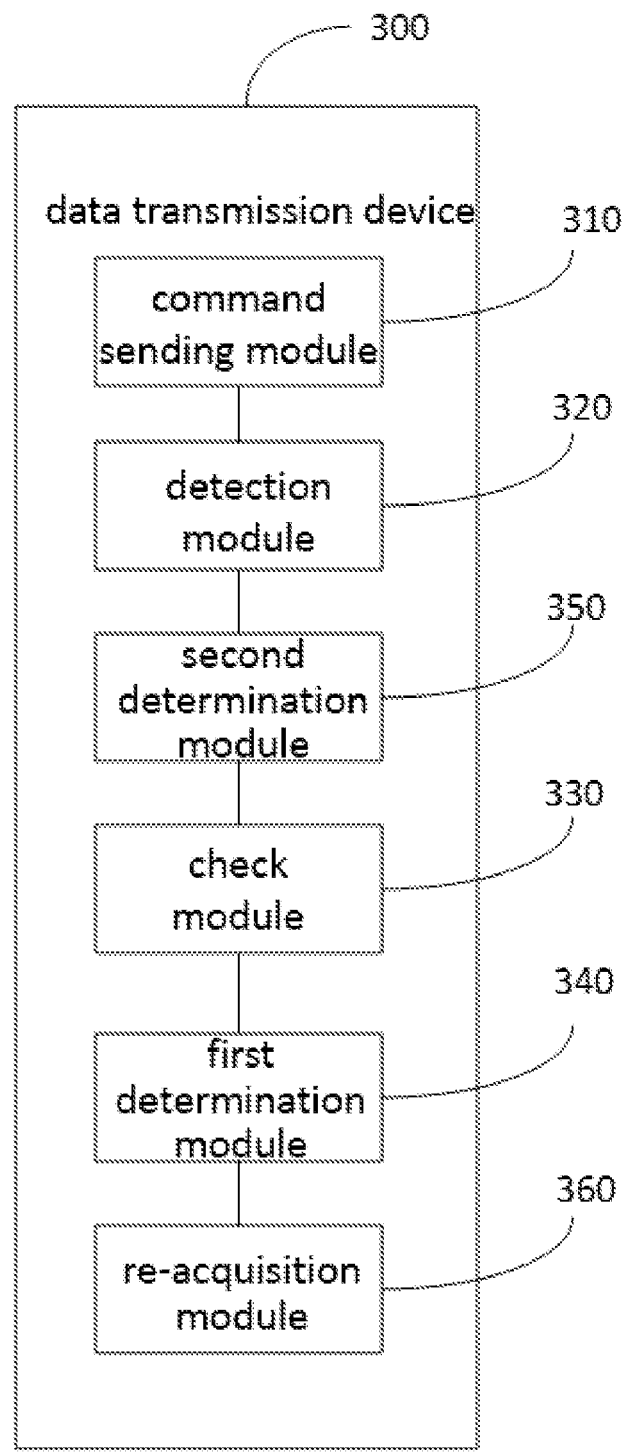
FIG. 4 is a second schematic diagram of the structure of a data transmission device provided by the embodiment of the present disclosure.

Referring to FIG. 3 and FIG. 4, FIG. 3 is a first schematic diagram of the structure of a data transmission device provided by the embodiment of the present disclosure; and FIG. 4 is a second schematic diagram of the structure of a data transmission device provided by the embodiment of the present disclosure. As shown in FIG. 3, the data transmission device 300 comprises:

a command sending module 310, configured for sending data acquisition commands to a plurality of target devices and turning on a timer;

a detection module 320, configured for detecting whether there is first target data transmitted by the first target device on the bus within a preset timing time, for any first target device of each of the target devices;

a check module 330, configured for, if yes, performing a data verification on the first target data and determining a communication flag bit of the first target device based on the check result; and a first determination module 340, configured for determining whether to receive the first target data transmitted by the first target device based on the communication flag bit of the first target device.

In a possible embodiment, the detection module 320 determines the preset timing time by the following steps:

calculating a transmission time for each frame of the data based on the baud rate, and determining a timing time for each frame of target data based on a preset time interval and the transmission time.

In a possible embodiment, when a check module 330 is configured for performing a data verification on the first target data and determining a communication flag bit of the first target device based on the check result, the check module 330 is specifically configured to:

detect whether a transmission length of the first target data is consistent with a preset target transmission length;

if they are consistent, perform a cyclical redundancy check on the first target data, and if the cyclical redundancy check is passed, identify the communication flag bit of the first target device as a first communication flag bit; and if the cyclical redundancy check is not passed, identify the communication flag bit of the first target device as a second communication flag bit; and if they are not consistent, identify the communication flag bit of the first target device as a third communication flag bit, and continue to wait for the transmission of the first target data.

In a possible embodiment, as shown in FIG. 4, the data transmission device further comprises a second determination module 350, wherein the second determination module 350 is configured to:

if not, identify the communication flag bit of the first target device as a third communication flag bit.

In a possible embodiment, when the first determination module 340 is configured to determine whether to receive the first target data transmitted by the target device based on the communication flag bit of the first target device, the first determination module 340 is specifically configured to:

detect the type of the communication flag bit of the first target device;

if the communication flag bit is a first communication flag bit, perform a data processing corresponding to the first target data and receive a next target data of the first target device after processing is complete;

if the communication flag bit is a second communication flag bit, send a data error identification and receive a second target data from a second target device; and if the communication flag bit is a third communication flag bit, skip the processing of the first target data and receive the second target data from the second target device of the plurality of the target devices.

In a possible embodiment, as shown in FIG. 4, the data transmission device 300 further comprises a re-acquisition module 360, wherein the re-acquisition module 360 is configured to:

send data acquisition commands at intervals of the preset timing time to the first target device corresponding to the third communication flag bit;

determine whether the status of the first target device corresponding to the third communication flag bit is normal or not, based on the collected second target data, which is sent by the first target device that corresponds to the third communication flag bit; and if it is normal, change the third communication flag bit of the first target device to the first communication flag bit.

The embodiment of the present disclosure provides a data transmission device, wherein the data transmission device comprises: a command sending module, configured for sending data acquisition commands to a plurality of target devices and turning on a timer; a detection module, configured for detecting, for any first target device of the plurality of target devices, whether there is first target data transmitted by the first target device on the bus within a preset timing time; a check module, configured for, if yes, performing a data verification on the first target data and determining a communication flag bit of the first target device based on the check result; and a first determination module, configured for determining whether to receive the first target data transmitted by the first target device based on the communication flag bit of the first target device. Data transmission of multiple devices is determined by detecting the data flow on the bus, which reduces the overall communication time and enables the normal transmission of data from other devices without being affected by problems in one device, thus improving the efficiency of data transmission.

Figure 5:
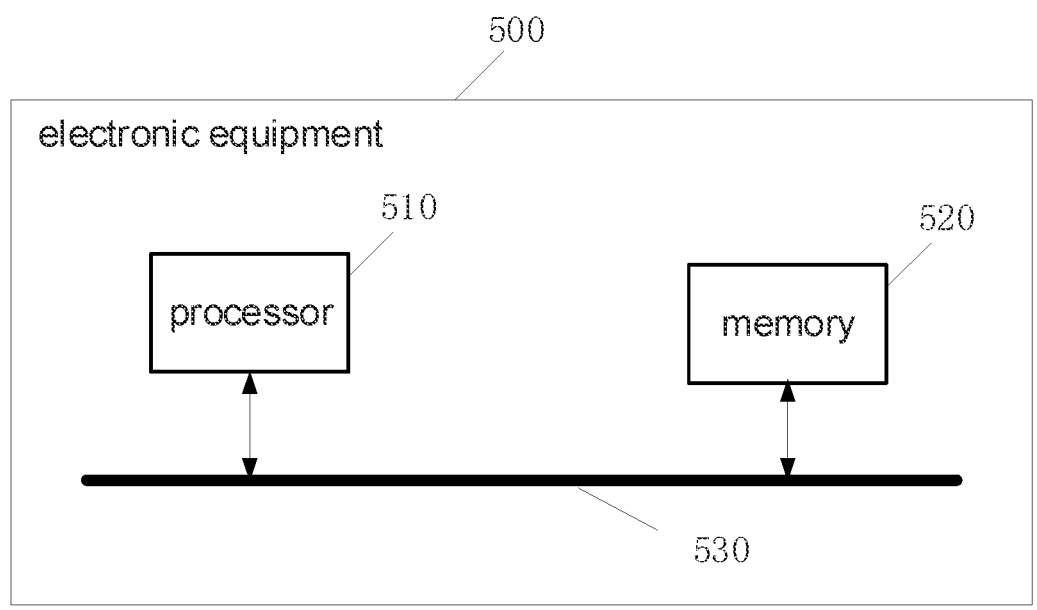
FIG. 5 is a schematic diagram of the structure of electronic equipment provided by the embodiment of the present disclosure.

Referring to FIG. 5, FIG. 5 is a schematic diagram of the structure of electronic equipment provided by the embodiment of the present disclosure. As shown in FIG. 5, the electronic equipment 500 comprises a processor 510, a memory 520, and a bus 530.

The memory 520 stores machine-readable instructions that are executed by the processor 510. The processor 510 communicates with the memory 520 via the bus 530 when the electronic equipment 500 is in operation, and the machine-readable instructions can perform the steps of the data transmission method in the above-mentioned method embodiment as shown in FIG. 1 when run by the processor 510. The specific implementations can be found in the method embodiments and will not be repeated here.

The embodiment of the present disclosure also provides a computer-readable storage medium, wherein the computer-readable storage medium is provided with a computer program stored thereon; and the computer program is able to perform the steps of the data transmission method in the above-mentioned method embodiment as shown in FIG. 1 when run by the processor. The specific implementations can be found in the method embodiments and will not be repeated here.

It will be clear to those skilled in the field that, for the convenience and brevity of the description, the specific working processes of the systems, devices, and units described above can be referred to as the corresponding processes in the preceding method embodiments and will not be repeated here.

In the several embodiments provided in the present disclosure, it should be understood that the systems, devices, and methods disclosed, can be implemented in other ways. The above-described embodiments of the device are merely schematic, for example, the division of the units described, which is only a logical functional division, can be set in another way when actually implemented. For another example, multiple units or components can be combined or can be integrated into another system, or some features can be ignored, or not implemented. On another point, the mutual coupling or direct coupling, or communication connection shown or discussed herein can be an indirect coupling or communication connection through some communication interfaces, devices, or units, which can be electrical, mechanical, or other forms.

The units illustrated as separate components can/cannot be physically separated, and the components displayed as units can/cannot be physical units, that is, they can be located in one place or distributed to a plurality of network units. Some or all of these units can be selected according to actual needs to achieve the objective of the solution of the embodiment.

Further, each functional unit in each embodiment of the present disclosure can be integrated into a single processing unit, or each unit can be physically present separately, or two or more units can be integrated into a single unit.

The functionality, when implemented as a software functional unit and sold or used as a stand-alone product, may be stored in a processor-executable non-volatile computer-readable storage medium. It is understood that the essential technical solution of the present disclosure, or that part of the technical solution that contributes to the prior art, or that part of such technical solution may be embodied in the form of a software product. The computer software product is stored in a storage medium comprising a number of instructions to cause a computer device (which may be a personal computer, a server, or a network device, etc.) to perform all or some of the steps of the method described in various embodiments of the present disclosure. The aforementioned storage media include various media that can store program code, such as USB flash drives, mobile hard drives, Read-Only Memory (ROM), Random Access Memory (RAM), disks, or CD-ROMs.

Finally, it should be noted that the above embodiments are only the specific examples of the present disclosure, which are used to illustrate the technical solution of the present disclosure, not to limit it. The protection scope of the present disclosure is not limited thereto. Although the present disclosure has been described in detail with reference to the preceding embodiment, it will be understood by those of ordinary skill in the art that any person skilled in the art within the scope of the technology disclosed in the present disclosure is still possible to modify or make readily conceivable changes to the technical solutions recorded in the foregoing embodiments, or to make equivalent substitutions to some of the technical features thereof; and these modifications, changes or substitutions, which do not make the essence of the corresponding technical solutions out of the spirit and scope of the technical solutions of the embodiments of the present disclosure, shall be covered within the scope of protection of the present disclosure. Therefore, the scope of protection of the present disclosure shall be based on the scope of protection of the claims.

What is claimed is:

1. A data transmission method, wherein the data transmission method comprises:
    sending data acquisition commands to a plurality of target devices and turning on a timer;
    detecting, for any first target device of the plurality of target devices, whether first target data transmitted by the first target device exists on a bus within a preset timing time;
    performing a data verification on the first target data and determining a communication flag bit of the first target device based on a check result; and
    determining whether to receive the first target data transmitted by the first target device based on the communication flag bit of the first target device,
    wherein the data verification comprises a transmission length check and a cyclical redundancy check; and the step of performing a data verification on the first target data and determining a communication flag bit of the first target device based on a check result comprises:
    detecting whether a transmission length of the first target data is consistent with a preset target transmission length;
    performing, if they are consistent, a cyclical redundancy check on the first target data, and if the cyclical redundancy check is passed, identifying the communication flag bit of the first target device as a first communication flag bit; if the cyclical redundancy check is not passed, identifying the communication flag bit of the first target device as a second communication flag bit; and
    identifying, if they are not consistent, the communication flag bit of the first target device as a third communication flag bit, and continuing to wait for a transmission of the first target data,
    wherein the step of determining whether to receive the first target data transmitted by the target device based on the communication flag bit of the first target device comprises:
    detecting a type of the communication flag bit of the first target device;
    performing, if the communication flag bit is the first communication flag bit, a data processing corresponding to the first target data and receiving next target data of the first target device after the processing is complete;
    sending, if the communication flag bit is the second communication flag bit, a data error identification and receiving a second target data from a second target device; and
    skipping, if the communication flag bit is the third communication flag bit, a processing of the first target data, waiting for the first target data to be transmitted and receiving the second target data from the second target device of the plurality of target devices.

2. The data transmission method according to claim 1, wherein the preset timing time is determined by following steps:
    calculating a transmission time for each frame of target data based on a baud rate; and determining a preset timing time for each frame of target data based on a preset time interval and the transmission time.

3. The data transmission method according to claim 1, wherein after the step of for any first target device of the plurality of target devices, detecting whether first target data transmitted by the first target device exists on a bus within a preset timing time, the data transmission method further comprises:

identifying, if not, the communication flag bit of the first target device as a second communication flag bit.

4. The data transmission method according to claim 1, wherein after the step of sending, if the communication flag bit is the second communication flag bit, a data error identification and receiving the second target data from the second target device, the data transmission method further comprises:

sending data acquisition commands at intervals of the preset timing time to the first target device corresponding to the second communication flag bit;

determining whether a status of the first target device corresponding to the second communication flag bit is normal or not, based on collected second target data, which is sent by the first target device that corresponds to the second communication flag bit; and changing, if it is normal, the second communication flag bit of the first target device to the first communication flag bit.

5. An electronic equipment, wherein the electronic equipment comprises: a processor, a memory, and a bus; the memory stores machine-readable instructions that are executed by the processor; the processor communicates with the memory via the bus when the electronic equipment is in operation; and the machine-readable instructions perform the steps of the data transmission method according to claim 1 when run by the processor.

6. A non-transitory computer-readable storage medium, wherein the computer-readable storage medium is provided with a computer program stored thereon; and the computer program performs the steps of the data transmission method according to claim 1 when run by a processor.

* * * * *